United States Patent Office 2,996,533
Patented Aug. 15, 1961

2,996,533
PREPARATION OF PHOSPHORO THIOATE DIESTERS
Allen F. Millikan, Crystal Lake, and Gifford W. Crosby, River Forest, Ill., assignors to The Pure Oil Company, Chicago, Ill., a corporation of Ohio
No Drawing. Filed May 28, 1958, Ser. No. 738,267
13 Claims. (Cl. 260—461)

This invention relates to new and useful improvements in phosphorothioate ester compositions, to methods of making the same, and to improved lubricant compositions containing a small amount of the esters sufficient to enhance the antiwear properties thereof. In particular, this invention is based upon the discovery that phenol, and mono- and dialkyl phenols, will react with formaldehyde or lower alkanals and phosphorus pentasulfide to produce an acid diester of a phosphorothioic acid having a sulfur-to-phosphorus ratio in the range of about 3–4/1, and an acid equivalent per atom of phosphorus of about 1. This invention is further based upon the discovery that when this acid ester is esterified to produce a neutral ester, the incorporation of the resulting product in a lubricating oil produces a lubricant composition of exceptional and unexpected antiwear properties.

Acid diesters of phosphorodithioic acids are commonly prepared by reacting an alcohol or phenol with phosphorus pentasulfide in a 4:1 mol ratio. The products of this reaction may be represented by the formula, $$(RO)_2P(S)SH$$

where R may be alkyl, aryl, alkylaryl, or arylalkyl, or derivatives thereof containing inert functional groups. The prior art, however, indicates that phosphorothioic acid esters having a sulfur/phosphorus ratio of more than 2 are produced only by reaction of phosphorus pentasulfide with sulfur-containing compounds. There is no suggestion in the chemical literature that organic compounds containing no sulfur will react with phosphorus pentasulfide to produce an ester having a sulfur/phosphorus atomic ratio substantially greater than 2.

It is therefore one object of this invention to provide a new and improved phosphorothioate ester composition which contains a high sulfur/phosphorus ratio.

Another object of this invention is to provide new, sulfur- and phosphorus-containing organic compounds of the group consisting of di(hydroxybenzyl) phosphorothioic acids and hydrocarbyl derivatives thereof, having a sulfur/phosphorus atomic ratio of about 3–4/1.

Another object of this invention is to provide a new and improved method for preparing phosphorothioate esters of high sulfur/phosphorus ratio.

A further object of this invention is to provide an improved lubricating oil composition containing an additive producing superior antiwear properties.

A feature of this invention is the provision of a new phosphorothioate ester composition having a sulfur/phosphorus ratio of about 3–4/1, produced by reaction of a phenol, an aldehyde, and phosphorus pentasulfide.

Another feature of this invention is the provision of a process for preparation of phosphorothioate esters of high sulfur/phosphorus ratios in which a phenol or substituted phenol is reacted with an aldehyde to produce an alkylol derivative thereof which is reacted with phosphorus pentasulfide to produce a phosphorothioate ester having a sulfur/phosphorus ratio of about 3–4/1.

A further feature of this invention is the provision of an improved lubricating oil composition containing in solution a small amount of one of the novel products of this invention in an amount sufficient to enhance substantially the antiwear properties of the oil.

Other objects and features of this invention will become apparent from time to time throughout the specification and claims as hereinafter related.

This invention is based upon our discovery that phenol, and mono- and dialkyl phenols, will react with phosphorus pentasulfide and low-molecular-weight aldehydes, e.g., formaldehyde and other $C_1$—$C_7$ alkanals, to produce an acid diester of a phosphorothioic acid having a sulfur/phosphorus atomic ratio of about 3–4/1. When the phenol or substituted phenol and the aldehyde are reacted, there is formed an alkylol derivative of the phenol which, when reacted with phosphorus pentasulfide in a mol ratio not less than about 4:1, undergoes some form of molecular rearrangement or disproportionation to produce an acid diester having a high sulfur/phosphorus ratio (instead of the expected S/P ratio of 2). In most cases the reaction also takes place when the three reactants are mixed together and heated to a temperature in the range from about 20° C. to the reflux temperature of the reaction mixture, as well as when the phenol and aldehyde are reacted prior to admixture with the phosphorus pentasulfide. The products of this reaction are novel compositions which have not previously been reported. As will become apparent, the product composition depends upon the starting reactants used. These reaction products have also been found to impart unexpectedly high antiwear properties to lubricating oils when dissolved in lubricating oils to the extent of about 0.005–1.0% by wt. of phosphorus. The invention is more fully illustrated by the following specific examples:

EXAMPLE I

A reaction flask, equipped with a stirrer and thermometer, was charged with 40.1 g. (0.43 mol) of phenol, 6.6 g. of paraformaldehyde (equivalent to 0.22 mol of formaldehyde), 24.7 g. (0.11 mol) of phosphorus pentasulfide and 150 ml. of benzene (as liquid reaction medium). The reaction mixture was maintained at 26°–33° C., with stirring, for 132 hours. At the end of this period, the reaction mass was separated into liquid and solid phases. The solid was essentially unconsumed phosphorus pentasulfide, and was washed with pentane, dried, and weighed, the dried weight being 21.0 g. The filtrate and solvent washings were combined and most of the benzene was removed by distillation. After distilling off the benzene (and dissolved $H_2S$) a high-boiling, liquid residue was obtained which weighed 36.0 g. This liquid product had a total acidity equivalent to 0.04 mol of acid, and contained 2.2 wt. percent phosphorus and 7.5 wt. percent sulfur. Thus, the indicated S/P atomic ratio was 3.3, and the indicated acidity/phosphorus equivalent ratio was 1.6. In dialkyl phosphorodithioic acids, which are the expected products of the reaction of an alcohol or phenol and phosphorus pentasulfide, the S/P atomic ratio is 2 and the acidity/phosphorus equivalent ratio is 1. It was concluded that in our reaction some form of molecular disproportionation occurred which produced a mixture of different acid diesters, probably esters of phosphorotrithioic acids and phosphorotetrathioic acids of the formula

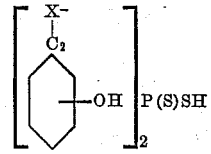

where the hydroxyl group may be in either the ortho- or para-position, and X is sulfur or oxygen with not more than one X oxygen. In this experiment, the recovery of phosphorus in the product was 77 wt. percent of that consumed in the reaction.

EXAMPLE II

In another experiment, the novel products of this invention were prepared by a two-step process. Methylolphenol (hydroxybenzyl alcohol) was prepared by dissolving 51.0 g. (1.28 mols) of sodium hydroxide in 540 ml. of water, and after allowing the solution to cool, adding to it 124.3 g. (1.32 mols) of phenol and 0.45 mol of formaldehyde (as formalin). The reaction mixture was then allowed to stand at room temperature for 24 hours, after which it was neutralized with a calculated, stoichiometric, amount of acetic acid. The resulting solution was extracted three times with ether, and the ether extract was steam-stripped to remove unreacted phenol. According to a publication by Granger, I. and E. C., 24, 442–8, 1932, this preparation yields 33% of monomethylolphenols, consisting of a mixture of saligenin (ortho-hydroxybenzyl alcohol) and para-hydroxybenzyl alcohol. On this basis, it was assumed that 0.44 mol of methylolphenol was obtained for use as a reactant in the second step of the experiment.

In the second step of the experiment, in accordance with this invention, 200 ml. of benzene and 22.2 g. (0.10 mol) of phosphorus pentasulfide were placed in a 500 ml. flask equipped with stirrer and thermometer, and mounted over a steam bath. The methylolphenol (0.44 mol) produced in the first step was then added dropwise over a 20-minute period. The reaction continued for one hour, with stirring. The temperature was maintained at 72°–76° C. During the reaction period, there was a vigorous evolution of hydrogen sulfide. At the end of this reaction period, there were three distinct phases, two immiscible liquids and a solid. The solid was essentially unreacted phosphorus pentasulfide and was separated by filtration. After being washed and dried, the amount of unreacted phosphorus pentasulfide was found to be 11.0 g.

The liquid phases of the reaction product were separated and the upper phase was recovered as the product of this invention, and was weighed and analyzed. There were obtained 60.0 g. of this liquid which was found to have a total acidity of 0.04 mol, and contained 6.9% wt. sulfur and 1.7% wt. phosphorus. The phosphorus content of this product amounted to 32% of that consumed in the reaction. The sulfur/phosphorus atomic ratio was 3.9 and the acidity/phosphorus equivalent ratio was 1.2. This product is clearly distinguishable from diaryl phosphorodithioic acids (e.g., diphenyl phosphorodithioic acid) in that both the S/P atomic ratio and the acidity/phosphorus ratio are greater than the values found in such acids. It is also to be noted that the reaction of phenol and phosphorus pentasulfide to produce diphenyl phosphorodithioic acid requires about 17 hours to go to completion, whereas this reaction was half complete in only one hour, based on the amount of phosphorus pentasulfide consumed in this time. From the reactants used in this process and the analysis of the products, it is believed that the reaction product is a mixture of di-(hydroxybenzyl) phosphorothioic acids comprising a mixture of phosphorotrithioic acids and phosphorotetrathioic acids. The fact that the acidity ratio is slightly greater than 1 may indicate the presence of small amounts of dibasic phosphorothioic acids.

EXAMPLE III

When the procedure of Example II is followed substituting acetaldehyde for the formaldehyde in the first step, the initial reaction product obtained consists primarily of a mixture of hydroxy-α-methylbenzyl alcohols (the α-methyl derivative of the methylolphenols produced in step 1 of Example II), e.g.,

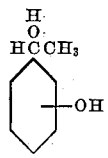

When this alkylolphenol product is reacted with phosphorus pentasulfide following the procedure of step 2 of Example II, a liquid product is obtained which is an acid diester of phosphorothioic acids, and has a sulfur/phosphorus atomic ratio in the range of 3–4/1 and an acidity/phosphorus equivalent ratio of about 1. The product probably includes the compound having the formula,

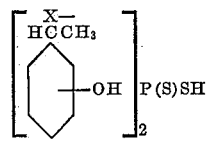

where the hydroxyl group is in the ortho- or para-position and X is oxygen or sulfur, at least one X being sulfur.

EXAMPLE IV

When the first step of Example II is repeated substituting n-pentanal for formaldehyde, the product obtained is the α-butyl derivative of the monomethylolphenol obtained in step 1 of Example II. When step 2 of Example II is carried out using these α-butyl derivatives of methylolphenol, a liquid product is obtained which comprises a mixture of diesters of phosphorothioic acids having a sulfur/phosphorus atomic ratio in the range of 3–4/1 and an acidity/phosphorus equivalent ratio of about 1. This product probably includes the compound having the formula,

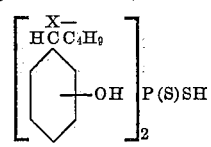

where the hydroxyl is in either the ortho- or para-position and X is oxygen or sulfur, at least one X being sulfur.

EXAMPLE V

In another experiment, 30 g. (1 mol) of formaldehyde and 22.3 g. of phosphorus pentasulfide were charged as a slurry with 300 ml. of benzene to a one-liter flask, equipped with sealed stirrer, thermometer, dropping funnel, and water-trap, under a reflux condenser. Then 117.2 g. (0.5 mol) of 2,4-di-t-amylphenol was diluted with 300 ml. of benzene and charged to the dropping funnel. The slurry was heated to reflux over steam with stirring and the benzene-diamylphenol solution was charged dropwise during a 35-minute period. The reaction was continued under reflux for 5 hours during which time some hydrogen sulfide evolved and 0.3–0.4 ml. of water was collected in the trap. At the end of the period, the product was filtered and 16 g. of unconsumed phosphorus pentasulfide was recovered. The filtrate was vacuum-nitrogen stripped to a weight of 151 g. Analysis of the product showed one equivalent of acid per phosphorus atom, a phosphorus content of 0.81 wt. percent and a sulfur content of 3.0 wt. percent, corresponding to a sulfur/phosphorus atomic ratio of 3.6. The product probably included the compound having the formula,

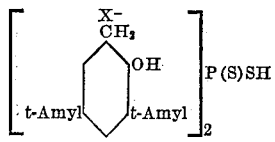

where X is oxygen or sulfur, at least one X being sulfur.

EXAMPLE VI

In another experiment, the two-step process was followed in preparing esters from the methylol derivative of 2,6-di-t-butylphenol. A beaker was charged with 0.5 mol of sodium hydroxide (10% aqueous solution), 0.5 mol of 2,6-di-t-butylphenol, 0.5 mol of formaldehyde (as formalin) and 600 ml. of methanol. The beaker was covered and methanol was added from time to time to keep the system in one phase. After 12 days' storage at room temperature, the reaction mixture was neutralized with a stoichiometric amount of hydrochloric acid. Water and benzene were then added to produce a two-phase system and the benzene phase separated. The aqueous phase was thoroughly washed with benzene and the washings added to the benzene phase. The composite benzene solution was then vacuum-nitrogen stripped. The product was further stripped by adding approximately one liter of toluene and then distilling the mixture with nitrogen under vacuum to effect complete removal of any traces of alcohol and water. The product obtained consisted of about 0.5 mol of methylol-2,6-di-t-butylphenol.

In the second step of the process, 13.6 g. (0.06 mol) of phosphorus pentasulfide and 0.24 mol of methylol-2,6-di-t-butylphenol were charged to a 500 ml. flask, equipped with a thermometer and motor-driven stirrer, and mounted over a steam bath. The reaction mixture was stirred at 90–95° C. for 4 hours at the end of which time the reaction appeared to be complete. The product was analyzed and found to contain 1.6 wt. percent phosphorus, 5.0 wt. percent sulfur (corresponding to an S/P atomic ratio of 3.0), and an acid equivalent/phosphorus ratio of 0.7. The product probably included the compound having the formula,

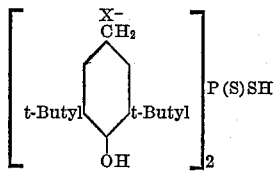

where X is oxygen or sulfur, at least one X being sulfur.

EXAMPLE VII

In still another experiment, 0.036 mol of the product produced by reaction of 2,4-di-t-amylphenol, formaldehyde, and phosphorus pentasulfide, was reacted with 4.5 g. (0.036 mol) of benzyl chloride as follows. A mixture of the aforementioned reaction product and benzyl chloride, plus 150 ml. of benzene, where charged to a 500 ml. flash equipped with stirrer and a tube dipping below the liquid surface. Ammonia was distilled into the reaction mixture by the dip-tube while the mixture was stirred for a period of two hours. The reaction mixture was then stored at room temperature for 80 hours. After this time, a substantial amount of ammonium chloride was found to have precipitated. The liquid product was diluted with pentane and filtered. The pentane was then distilled from the filtrate and the residue analyzed. The product had an analysis corresponding to a yield of 60% of the neutral benzyl ester of the acid diester reactant used in the process.

The phosphorothioate ester compositions which are produced by this process have been found to have unexpectedly superior properties when used as antiwear additives for lubricating oil compositions. These ester compositions, when added to lubricating oils to produce a phosphorus concentration in the oil in the range of 0.005–1.0%, have been found to reduce wear of moving parts lubricated therewith to an unexpected degree. To demonstrate the superiority of lubricating compositions including small amounts of the products of this process, a number of lubricant compositions were prepared using mineral lubricating oil and various products as additives to demonstrate the antiwear properties thereof. These oil compositions were tested in the Shell Four-Ball EP Test Apparatus under a 20 kg. load, at 1800 r.p.m., for 5 minutes at room temperature. Under these conditions of load, the balls are elastically deformed at point of contact to produce a circular area of contact between each of the balls having a diameter of 0.236 mm. The measure of resistance of an oil to wear (i.e., the antiwear properties thereof) is the ability of the oil to prevent formation of a wear scar having a diameter greater than the initial diameter of the circular area of contact or elastic indentation. To illustrate the significance of this test, a number of runs were made using two different lubricating oil bases as lubricants for the balls in the Four-Ball Test Apparatus. In one series of runs, the lubricating oil base was a solvent-refined 170 vis., 100 V.I. neutral oil, while in the other series of runs the lubricating oil was a phenol extract produced in the making of 85 vis., 100 V.I. neutral oil. In some of the runs a blank lubricating oil was used as a check, while in other runs the products of this invention were used as additives for the oil to determine the wear resistance imparted thereby. In each case, the additive was used in an amount producing a concentration corresponding to 0.1 wt. percent phopshorus in the oil. In evaluating the performance of these antiwear additives in the lubricating oils, various oil compositions were evaluated for their ability to produce resistance to wear in the Four-Ball Test Apparatus, and the size of the wear scars were compared. Since the wear scar can never be smaller in diameter than the elastic indentation, the comparison of wear using different lubricants is best made by measuring the increase in scar diameter over the diameter of elastic indentation. Oils which have superior antiwear properties will, of course, produce scars having a smaller increase in diameter than oils which do not provide wear protection. The results of a series of runs using the indicated lubricating oils, both with and without the additives, are reported in Table I as follows:

*Table I*

| Lubricant | No. Tests | Average increase in scar diameter over diameter of elastic indentation, mm.×10³ |
| --- | --- | --- |
| 170/100 Neutral oil | 4 | 144 |
| 170/100 Neutral Oil plus additive 1 | 3 | 68 |
| Phenol extract from 85/100 Neutral oil | 1 | 214 |
| Phenol extract from 85/100 Neutral oil plus additive 2 | 3 | 39 |
| 170/100 Neutral oil plus additive 3 | 3 | 77 |
| 170/100 Neutral oil plus additive 4 | 1 | 110 |

Additive 1—Acid diester produced by reaction of 2,4,-di-t-amylphenol, formaldehyde and P₂S₅.
Additive 2—Acid diester produced by reaction of 2,6-di-t-butylphenol, formaldehyde and P₂S₅, according to Example VI.
Additive 3—Neutral benzyl ester of additive 1 produced according to Example VII.
Additive 4—Tribenzyl phosphorotetrathioate.

From the foregoing data, it is seen that the phosphorothioate esters produced in accordance with this invention are superior antiwear additives for lubricating oils. In fact, the esters of this invention are superior to a high-sulfur, neutral triester such as tribenzyl phosphorotetrathioate, as an antiwear additive. The neutral triesters produced in accordance with this invention are preferred as antiwear additives since they are relatively noncorrosive compounds.

While we have described this invention with emphasis upon several specific embodiments thereof, it should be understood that the scope of the invention is not limited to those specific embodiments. In the process of this invention phenol, or any monoalkylphenol or dialkylphenol, may be reacted with phosphorus pentasulfide and a low-molecular-weight aldehyde, e.g., formaldehyde or a $C_1$—$C_7$ aldehyde, at a temperature in the range from room temperature to the reflux temperature of the reaction mixture. The mol ratio of reactants used is preferably 4 mols of the phenol to 4 mols of aldehyde to 1 mol of phosphorus pentasulfide. The products of this process are novel compositions which have 3 to 4 sulfur atoms and 1 acidic hydrogen atom for each phosphorus atom. We believe that the products of this invention include compounds of the general formula:

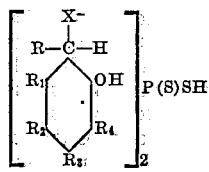

or

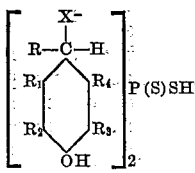

or mixtures thereof, where R is hydrogen or lower ($C_1$–$C_6$) alkyl, $R_1$, $R_2$, $R_3$, and $R_4$ are hydrogen or alkyl, at least two being hydrogen, and X is oxygen or sulfur, at least one being sulfur. As is apparent, the product composition depends upon the starting reactants used. These products are obtained as complex mixtures from which pure compounds could be separated, but are actually used as recovered from the reaction mixture or, as in Example VII, converted to a neutral triester. These products, both as acid diesters and as neutral triesters, are useful for inhibiting wear when added to lubricating oils to produce a phosphorus concentration of 0.005–1.0% by wt. in solution in the oil. They may be used in plain mineral lubricating oils, or in oils which contain other additives such as detergents, corrosion inhibitors, etc.

What is claimed is:

1. A reaction product produced by reaction of phosphorus pentasulfide, a lower alkanal, and a phenol selected from the group consisting of phenol, monoalkyl phenols, monoalkyl phenols, and dialkyl phenols in a 1:4:4 mol ratio, said product having an acid equivalent per atom of phosphorus of about 1 and an S/P atomic ratio of 3–4/1.

2. A reaction product produced according to claim 1 in which the alkanal reactant is formaldehyde.

3. A reaction product produced by reaction of phosphorus pentasulfide with an alkylolphenol in a 1:4 mol ratio, said product having an acid equivalent per atom of phosphorus of about 1 and an S/P atomic ratio of 3–4/1.

4. A reaction product produced according to claim 3, in which the alkylolphenol used is methylolphenol.

5. A method of preparing phosphorothioate acid diesters having an S/P atomic ratio of 3–4/1 which comprises reacting a compound of the group consisting of phenol, monoalkylphenols, and dialkylphenols, with a low-molecular-weight aldehyde and phosphorus pentasulfide at a temperature in the range from room temperature to the reflux temperature of the reaction mixture at a phenol-phosphorus pentasulfide mol ratio not less than about 4/1.

6. A method in accordance with claim 5 in which the aldehyde used is formaldehyde in an amount sufficient to react with the phenol to form the monomethylol derivative thereof.

7. A method in accordance with claim 5 in which the aldehyde and phenol are reacted to form a monoalkylol derivative of the phenol prior to reaction with the phosphorus pentasulfide.

8. A method in accordance with claim 5 in which the reaction is carried out in solution in an inert solvent.

9. A method of preparing phosphorothioate acid diesters having an S/P atomic ratio of about 3–4/1 which comprises reacting a compound of the group consisting of phenol, monoalkyl phenols, and dialkylphenols with formaldehyde to produce a monomethylol derivative of the phenol, and reacting said methylol derivative of the phenol in at least a 4:1 mol ratio with phosphorus pentasulfide, at a temperature in the range from room temperature to the reflux temperature of the reaction mixture.

10. A method in accordance with claim 9 in which phenol is used in the initial reaction and the reaction with phosphorus pentasulfide is carried out in benzene.

11. A method in accordance with claim 9 in which 2,4-di-t-amylphenol is used in the initial reaction.

12. A method in accordance with claim 9 in which 2,6-di-t-butylphenol is used in the initial reaction.

13. A method of preparing phosphorothioate acid diesters having an S/P atomic ratio of about 3–4/1 which comprises reacting a compound of the group consisting of phenol, monoalkylphenols and dialkylphenols with acetaldehyde to produce a monoalkylol derivative of the phenol, and reacting said derivative in at least a 4:1 mol ratio with phosphorus pentasulfide, at a temperature in the range from room temperature to the reflux temperature of the reaction mixture.

References Cited in the file of this patent

UNITED STATES PATENTS

| | | |
|---|---|---|
| 1,593,232 | Whitworth | July 20, 1926 |
| 2,531,129 | Hook et al. | Nov. 21, 1950 |
| 2,561,773 | Augustine | July 24, 1951 |
| 2,586,655 | Hook et al. | Feb. 19, 1952 |
| 2,589,675 | Cook et al. | Mar. 18, 1952 |
| 2,614,988 | Hook et al. | Oct. 21, 1952 |
| 2,665,295 | Augustine | Jan. 5, 1954 |
| 2,694,084 | Brugman | Nov. 9, 1954 |
| 2,743,235 | McDermott | Apr. 24, 1956 |
| 2,745,863 | Otto | May 15, 1956 |